(No Model.)

J. F. WOOD.
CANE MILL.

No. 280,705. Patented July 3, 1883.

Attest:
N. A. Clark.
P. B. Turpin

Inventor
James F. Wood
By R. S. & A. P. Lacey
Att'y.

UNITED STATES PATENT OFFICE.

JAMES F. WOOD, OF WOODYARDS, OHIO.

CANE-MILL.

SPECIFICATION forming part of Letters Patent No. 280,705, dated July 3, 1883.

Application filed October 25, 1882. (No model.)

*To all whom it may concern:*

Be it known that I, JAMES F. WOOD, a citizen of the United States, residing at Woodyards, in the county of Athens and State of Ohio, have invented certain new and useful Improvements in Cane-Mills; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in cane-mills; and it consists in the construction, combination, and arrangement of the several parts, as will be hereinafter fully described, and specifically pointed out in the claim.

Figure 1:
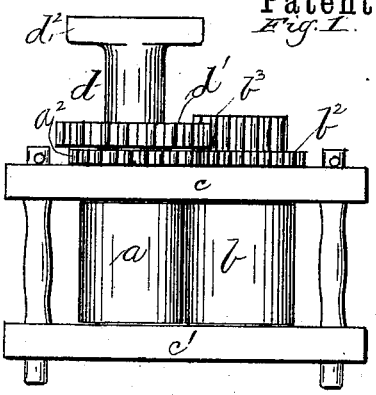
Figure 2:
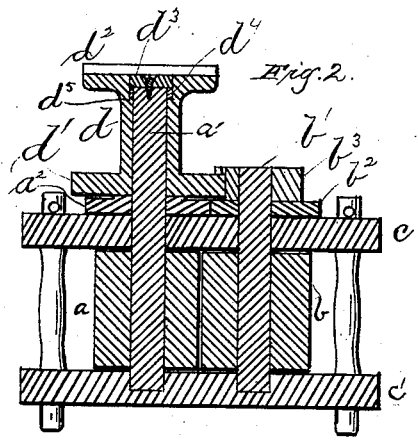
Figure 4:
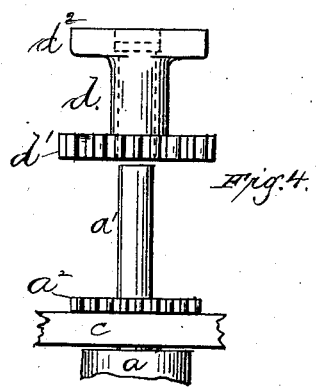
Figure 3:
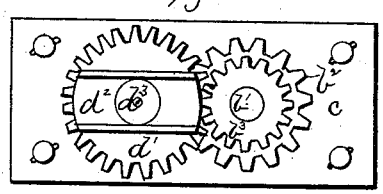

In the drawings, Figure 1 is a side view, Fig. 2 a vertical section, and Fig. 3 a plan view, of a mill constructed according to my invention. Fig. 4 is a detail view.

The rollers $a\,b$ are journaled in the upper and lower beams, $c\,c'$, of the frame, with their peripheries nearly touching. The shaft $a'$ of the roller $a$ is extended a considerable distance above the beam $c$, and has the pinion $a^2$ keyed to it, close to the top of the beam $c$, as shown. The shaft $b'$ of the roller $b$ is extended above the beam $c$, and has the gear-wheels $b^2\,b^3$ keyed on it. The wheel $b^2$ is meshed with the wheel $a^2$, and the wheel $b^3$ is arranged immediately above the wheel $b^2$, in position to be meshed by the gear-wheel on the hollow sweep-post, hereinafter described.

$d$ is the hollow sweep-post, sleeved and revolving on the extension of the shaft $a'$. It is provided on its lower end with a gear-wheel, $d'$, adapted to engage the wheel $b^3$ on shaft $b'$, and on its upper end with side bars, $d^2$, projected at right angles and adapted to receive the sweep, to which a horse may be attached in order to operate the machine. This is the most common way to operate mills of this class; but it will be understood that a pulley could be secured on the sweep-post to receive a band driven by a steam-engine, or otherwise, as may be desired. The post is secured on the extension $a'$ by a cap, $d^3$, resting down on a collar or washer, $d^4$, placed in an annular enlargement, $d^5$, formed in the upper end of the shaft-opening in said post. The periphery of the cap $d^3$ extends beyond the periphery of the upper end of shaft $a'$, and, being made fast to the latter, prevents the post $d$ from being lifted vertically, and thereby the meshing of the wheel $d'$ with wheel $b^3$ is perfectly preserved, and the movements are all even and regular. The sweep is fixed on the head or sweep-seat $d^2$, and does not interfere with the revolution of the cap $d^3$ and shaft $a'$.

It will be seen that I make the wheels $a^2\,b^2$ the same size, and larger than the wheel $b^3$, that wheel $b^3$ is made smaller than the wheel $d'$, which gives it motion, and that the motion transmitted from large wheel $d'$ to small wheel $b^3$, and thence to wheel $a^2$, revolves the wheels $a^2\,b^2$, and hence the rollers $a\,b$, faster than the sweep-post.

By the arrangement described the parts are conveniently and compactly arranged. The wheels $b^2\,b^3$, being keyed close together on the shaft $b'$, are practically a single cone gear-wheel, and might under some circumstances be made of the same diameter; but I prefer to make them as shown, for the purpose of securing the increased speed of the machine.

In operation, it will be understood, the cane is passed through between the revolving crushing-rollers $a\,b$.

The several gear-wheels of this device are arranged in compact form. The post $d$ and its wheel $d'$ bear upon the upper side of the wheel $a^2$, fixed upon the shaft $a'$ of the roller $a$. The wheel $a^2$ is arranged to revolve close to the upper side of the framing-beam $c$. The wheel $b^2$ is also arranged close to the upper side of the framing-beam $c$, and the wheel $b^3$ is placed on wheel $b^2$, and both are fixed rigidly together and to the shaft $b'$, so that they become practically as one cone gear-wheel, in which the cogs are arranged to engage both of the wheels $a^2\,d'$. The rollers $a$ and $b$ are arranged with their upper ends in close proximity to the under side of the cross-beam $c$, their shafts being extended upward through said beam and adapted to receive the several gear-wheels and the sweep-post, as hereinbefore explained.

In the arrangement of the several parts hereinbefore described, I have furnished a mill in which will be found the highest power requisite for the purposes intended, and which will be free from the extreme wear attending mills of ordinary construction in the class to which mine belongs. All the strain is exerted above the framing-bar c. There being no interposed bearings or wheels between the ends of the rollers a b and the bearings of said rollers, the liability to injure the rollers and wheels when solid pieces or joints of cane are being crushed is reduced to the smallest degree.

I am aware that it is not new to have two shafts geared together by a series of interlapping gear-wheels, and having a sweep fixed to a gear-wheel placed upon the shaft of and revolving independently of one of the interlapped gears, and I do not claim such, broadly, as my invention.

Having thus described my invention, what I claim, and desire to secure by Letters Patent, is—

The improved cane-mill, consisting of the frame $c\ c'$, the rollers $a\ b$, journaled in and arranged between the beams $c\ c'$, and having their shafts extended through and above the upper beam, $c$, the gears $b^2\ b^3$, placed in contact and fixed on the upper end of the shaft of roller $b$, above and close to the beam $c$, the gear $a^2$, fixed upon the shaft of roller $a$, above and close to the beam $c$, and meshing with the gear $b^2$, the sweep-post $d$, placed upon and revolving loosely on shaft $a'$, and having on its lower end the gear-wheel $d'$, meshing with the upper gear, $b^3$, and having the annular enlargement $d^5$ in the upper end of its shaft-opening, and the retaining disk or cap $d^3$, placed within the enlargement $d^5$ and made fast to the end of shaft $a'$, substantially as set forth.

In testimony whereof I affix my signature in presence of two witnesses.

JAMES F. WOOD.

Witnesses:
HENRY T. BROWN,
E. A. TINKER.